United States Patent
Vacek et al.

(10) Patent No.: US 6,438,940 B1
(45) Date of Patent: Aug. 27, 2002

(54) METHODS AND APPARATUS FOR PROVIDING UNIFORM IGNITION IN AN AUGMENTER

(75) Inventors: Larry L. Vacek, West Chester; Thomas C. Gerrety, Cincinnati; William R. Haskiell, Batavia; Elvin D. Hirtle, Cincinnati; Richard M. Holcombe, West Chester, all of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/467,955

(22) Filed: Dec. 21, 1999

(51) Int. Cl.[7] .................................................. B63H 11/00
(52) U.S. Cl. ........................................................ 60/204
(58) Field of Search .............................. 60/261, 39.821, 60/39.827, 39.06, 212, 204

(56) References Cited

U.S. PATENT DOCUMENTS

| | | | | |
|---|---|---|---|---|
| 3,793,838 A | * | 2/1974 | Nash | 60/261 |
| 3,800,530 A | * | 4/1974 | Nash | 60/261 |
| 3,910,036 A | * | 10/1975 | Irwin | 60/39.32 |
| 4,275,559 A | * | 6/1981 | Blair | 60/39.82 |
| 4,903,476 A | * | 2/1990 | Steber et al. | 60/39.32 |
| 5,076,062 A | * | 12/1991 | Abreu | 60/749 |
| 5,335,490 A | * | 8/1994 | Johnson et al. | 60/261 |
| 5,402,637 A | * | 4/1995 | Adam | 60/39.827 |
| 5,813,221 A | * | 9/1998 | Geiser et al. | 60/261 |

* cited by examiner

*Primary Examiner*—Charles G. Freay
*Assistant Examiner*—William H Rodriguez
(74) *Attorney, Agent, or Firm*—Rodney M. Young; Armstrong Teasdale LLP

(57) ABSTRACT

An augmenter includes at least one igniter which provides a uniform ignition within the augmenter. The igniter is secured to an igniter housing with a self-locking nut and each igniter includes a biasing mechanism which biases the igniter against the augmenter. Biasing the igniter against the augmenter ensures that each igniter tip is maintained at a proper immersion depth within the augmenter during gas turbine engine operation. Additionally, the igniter includes an alignment support boss to ensure that the igniter tip is properly aligned within the augmenter as the igniter is attached to the augmenter.

20 Claims, 4 Drawing Sheets

METHODS AND APPARATUS FOR PROVIDING UNIFORM IGNITION IN AN AUGMENTER

BACKGROUND OF THE INVENTION

This invention relates to augmenters, and more particularly, to augmenter igniters.

Augmenters are used in gas turbine engines to increase thrust as needed in a flight envelope. An igniter is typically located circumferentially near a bottom of the augmenter. The ignitor typically includes an igniter mounting assembly and an igniter lead extending from an ignition box to an igniter tip. The igniter tip provides an ignition source for the augmenter.

An igniter mounting assembly secures the igniter to the augmenter. Typically the mounting assembly includes an igniter housing secured to the augmenter with a plurality of fasteners. The igniter housing includes an opening at both ends which permits the igniter to extend therethrough to the augmenter. The igniter is installed such that the igniter tip extends into the augmenter a pre-determined immersion depth.

When a gas turbine engine is operating, fuel and air flow through the augmenter at a high temperature and velocity. The high temperatures of the fuel and air subject the augmenter and its associated components to thermal stresses and thermal growths. Such thermal growths often force the igniter radially inward into an ignition zone area which increases the igniter tip temperature and decreases the igniter tip life. As a result, the igniter tip is continually mis-aligned which may decrease the overall performance of the associated gas turbine engine. To correct such igniter tip misalignments, typically a floating ferrule arrangement is included at an interface between the igniter tip and the ignition zone.

In an effort to prevent the thermal growth from having an adverse effect on the igniter, a bulky and adjustable igniter mounting assembly is used. Such an assembly includes a plurality of components fastened tightly together to prevent any single component from thermally expanding independently of any other component. As a result, the components thermally expand causing misalignments and improper immersion depths. Additionally, the bulky floating ferrule assembly extends outward from the augmenter ignition zone and blocks cooling air flow used to cool other gas turbine engine components. Furthermore, because the components are fastened together, although the igniter tip remains in proper alignment with respect to the mounting assembly, it may not remain at a proper immersion depth or at a proper alignment with respect to the augmenter. As a result, overall gas turbine light off performance is decreased.

BRIEF SUMMARY OF THE INVENTION

In an exemplary embodiment, an augmenter includes an igniter mounting assembly which maintains an igniter tip at a proper immersion depth. The igniter includes an igniter lead and an igniter housing assembly. The igniter lead extends from an ignition box and terminates in an igniter tip. The housing assembly is secured to an augmenter with a pair of fasteners and the igniter is secured within the housing assembly with a self-locking nut.

The igniter and igniter housing also include a biasing mechanism coupled between the igniter and the igniter housing. The biasing mechanism biases the igniter against the augmenter to ensure that the igniter tip is maintained at a proper immersion depth within an augmenter ignition zone during gas turbine engine operation. Additionally, the igniter includes an alignment support boss sized to be received in a chamfered opening disposed within the augmenter. The combination of the alignment support boss and the chamfered opening automatically aligns the igniter tip for proper operation when the igniter is fully attached to the augmenter. Furthermore, as the gas turbine engine is operated, the biasing mechanism maintains the igniter tip at a proper immersion depth within the augmenter. In addition, since the igniter is secured within the igniter housing with only a self-locking nut, igniter maintenance efforts are streamlined.

DETAILED DESCRIPTION OF THE INVENTION

Figure 1:
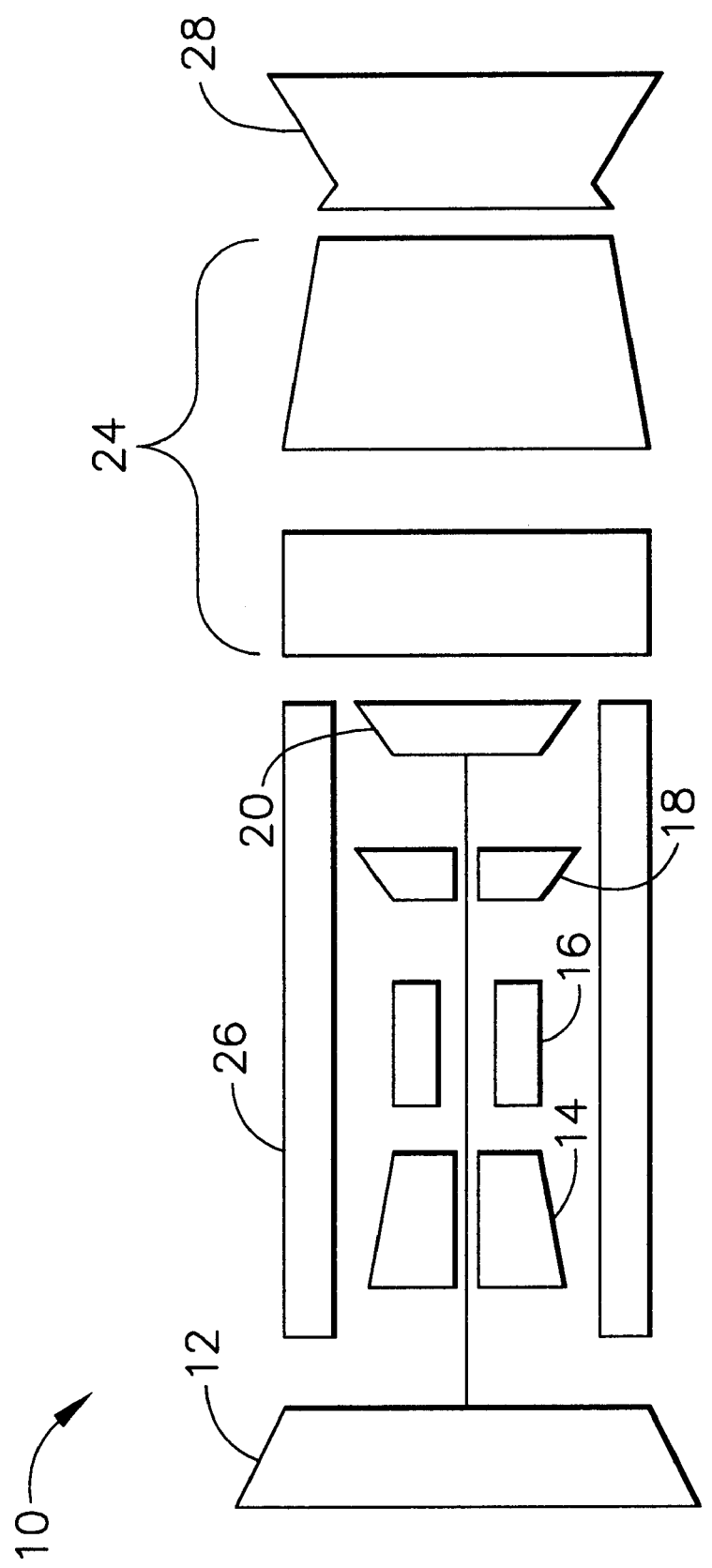
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, a low pressure turbine 20, and an augmenter 24.

In operation, air flows through low pressure compressor 12 and compressed air is supplied from low pressure compressor 12 to high pressure compressor 14. Highly compressed air is then delivered to combustor 16 and airflow from combustor 16 drives turbines 18 and 20. Airflow enters augmenter 24 from turbine 20 and from a bypass duct 26. Augmenter 24 re-ignites the airflow with at least one igniter (not shown in FIG. 1) and the airflow exits gas turbine engine 10 through a nozzle 28.

Figure 2:
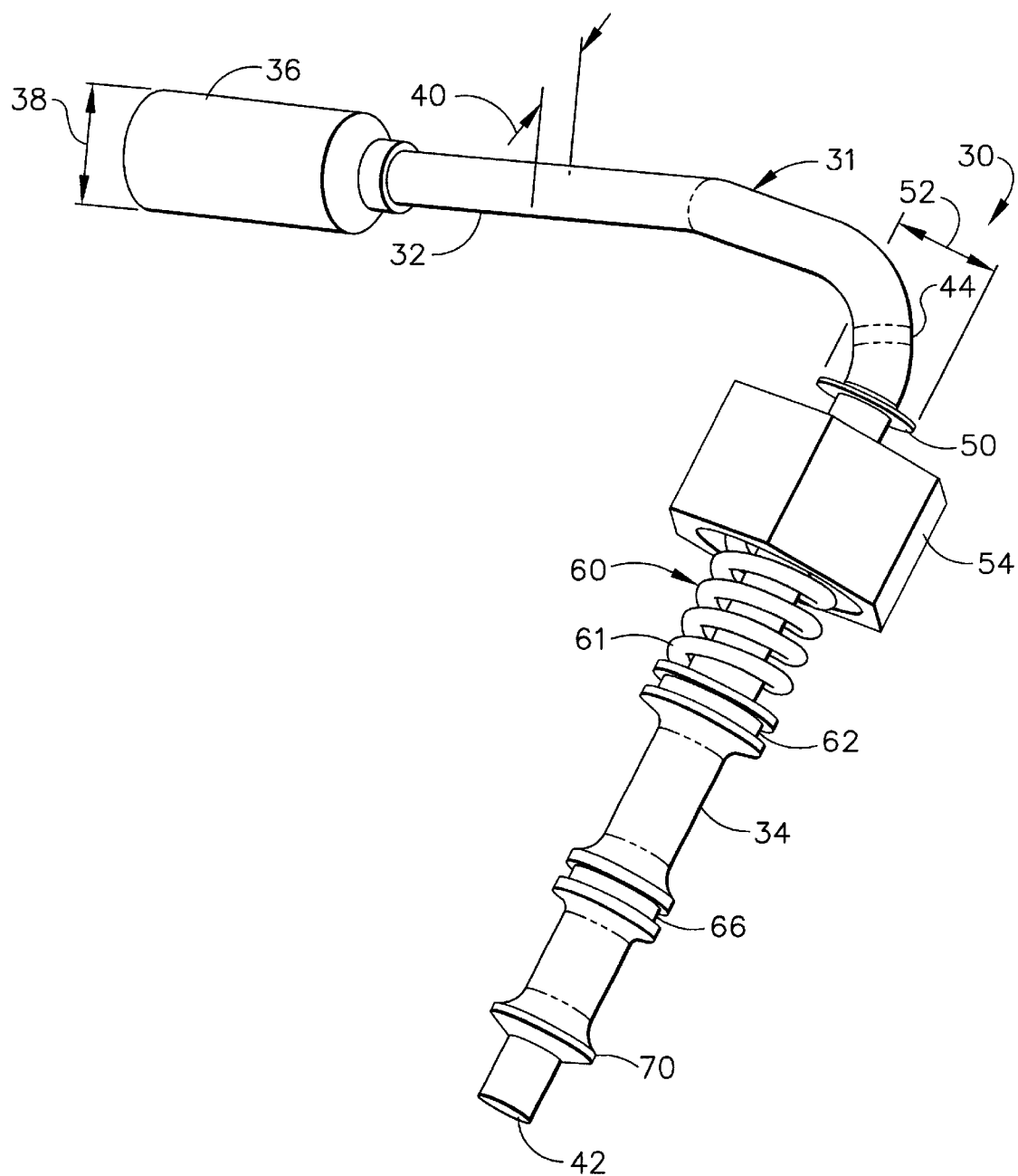
FIG. 2 is a perspective view of view of an igniter which may be used in the gas turbine engine shown in FIG. 1.

FIG. 2 is a perspective view of an igniter 30 utilized in a gas turbine engine, such as gas turbine engine 10. Igniter 30 includes an igniter lead 31 having a first body portion 32 and a second body portion 34. First body portion 32 extends from second body portion 34 to a connector 36. Connector 36 has a diameter 38 larger than a diameter 40 of igniter lead 31. Connector diameter 38 permits connector 36 to attach to a flexible lead (not shown) extending from an ignition box (not shown). Second body portion 34 extends from igniter first body portion 32 to an igniter tip 42.

Igniter first body portion 32 includes a bend 44 extending between igniter first body portion 32 and igniter second body portion 34. Bend 44 is curved such that igniter first body portion 32 is substantially perpendicular to igniter second body portion 34.

A nut retaining collar 50 extends from igniter lead 31 between igniter bend 44 and igniter second body portion 34. Nut retaining collar 50 has a diameter 52 larger than igniter lead diameter 40. Diameter 52 is also larger than an inner diameter (not shown in FIG. 2) of an opening (not shown in FIG. 2) of a self-locking nut 54. Self-locking nut 54 is circumferentially disposed around igniter 30 and includes a cap (not shown in FIG. 2) and a plurality of threads (not shown). The threads are sized to engage an igniter housing (not shown in FIG. 2) to secure self-locking nut 54 to the igniter housing while igniter 30 remains in slidable contact within the igniter housing. Therefore, igniter 30 is capable of sliding with respect to the igniter housing such that nut retaining collar 50 may contact self-locking nut 54. The diameter of the cap opening is smaller than diameter 52 of nut retaining collar 50. Accordingly, nut retaining collar 50 limits an amount of travel of igniter second body portion 34 through self-locking nut 54.

The self-locking nut cap is configured to compress an igniter compression spring 60 as self-locking nut 54 is tightened to the igniter housing. Compression spring 60 is a biasing mechanism circumferentially positioned around igniter lead 31 between self-locking nut 54 and an o-ring groove 62. A first end (not shown in FIG. 2) of compression spring 60 is positioned within self-locking nut 54 adjacent the self-locking nut cap and a second end 61 of compression spring 60 is positioned adjacent an o-ring groove 62. O-ring groove 62 is sized to receive an o-ring (not shown in FIG. 2) to sealingly contact the igniter housing.

Igniter second body portion 34 includes a second oaring groove 66 sized to receive a second o-ring (not shown in FIG. 2) to sealingly contact a floating ferrule (not shown in FIG. 2). Second o-ring groove 66 is positioned between o-ring groove 62 and igniter tip 42. An alignment support boss 70 extends radially outward from igniter lead 31 between o-ring groove 66 and igniter tip 42. Alignment support boss 70 is spherical and has a spherical cross-sectional profile (not shown in FIG. 2) sized to be received in an opening (not shown in FIG. 2) disposed within an augmenter flameholder (not shown in FIG. 2).

Figure 3:
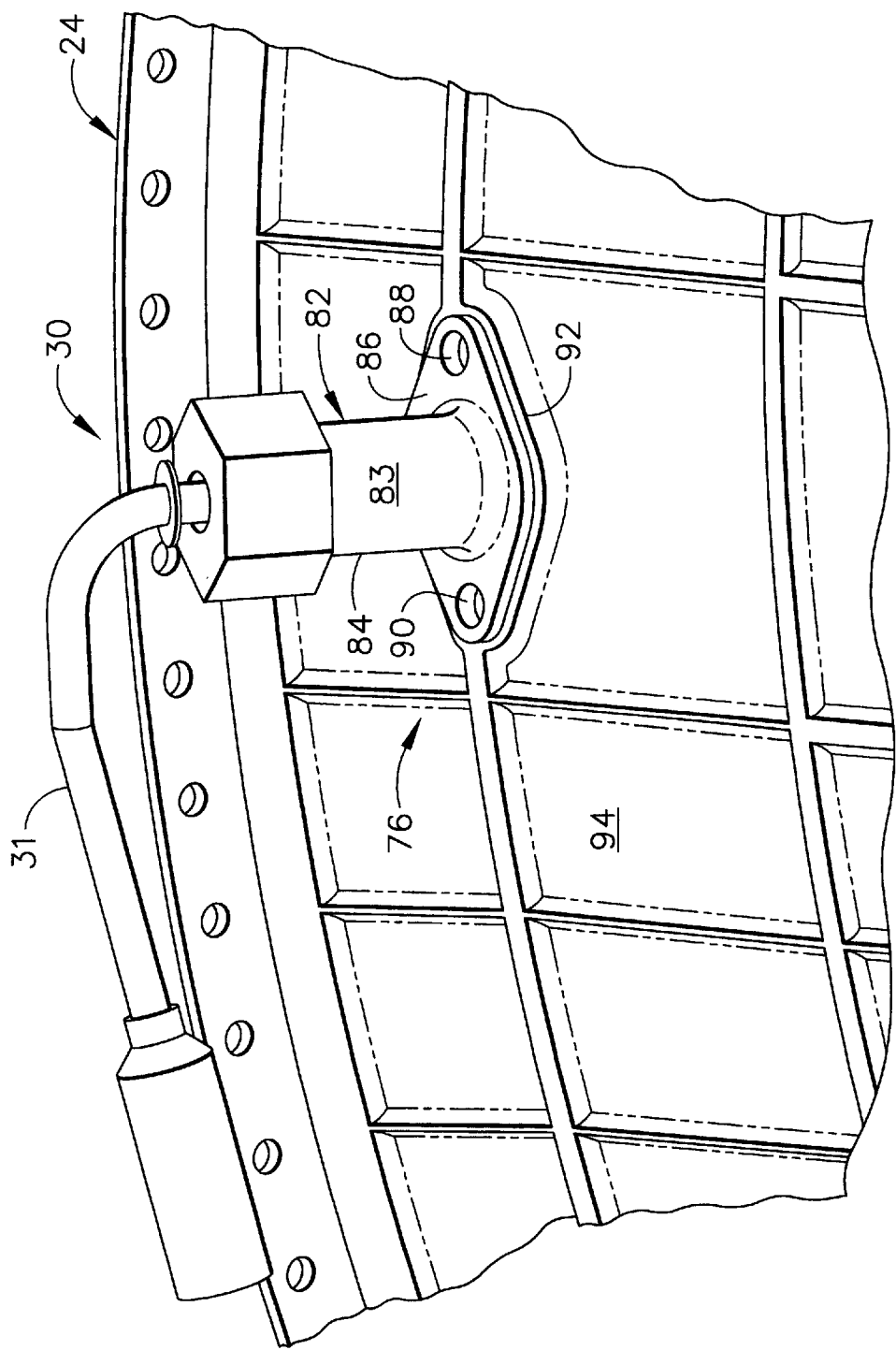
FIG. 3 is a perspective view of the igniter shown in FIG. 2 attached to an augmenter.

FIG. 3 is a perspective view of igniter 30 attached to augmenter 24 with an igniter mounting assembly 76. Igniter mounting assembly 76 includes an igniter housing 82 including an outer surface 83. Outer surface 83 includes a plurality of threads (not shown) sized to receive the igniter self-locking nut threads. When igniter 30 is fully attached to augmenter 24, igniter housing 82 is circumferentially disposed around igniter lead 31. Igniter housing 82 includes a first body portion 84 and a second body portion 86. First body portion 84 is cylindrical and extends from second body portion 86 to a first end (not shown in FIG. 3) of igniter housing 82. The igniter housing threads are positioned proximate the igniter housing first end.

Igniter housing second body portion 86 is a substantially flat member and includes a pair of openings 88 and 90. Igniter housing second body portion 86 is sized to be received within a housing pad 92. Housing pad 92 is positioned within an an augmenter duct 94 and is machined such that igniter housing second body portion 86 fits snuggly to a machined surface (not shown). In one embodiment, housing pad 92 has a parallelogram shape. Openings 88 and 90 are cylindrical and are sized to receive a pair of fasteners (not shown) which extend therethrough into a pair of threaded openings (not shown) disposed within augmenter duct 94. In one embodiment, the fasteners are 0.19 inch diameter bolts.

Figure 4:
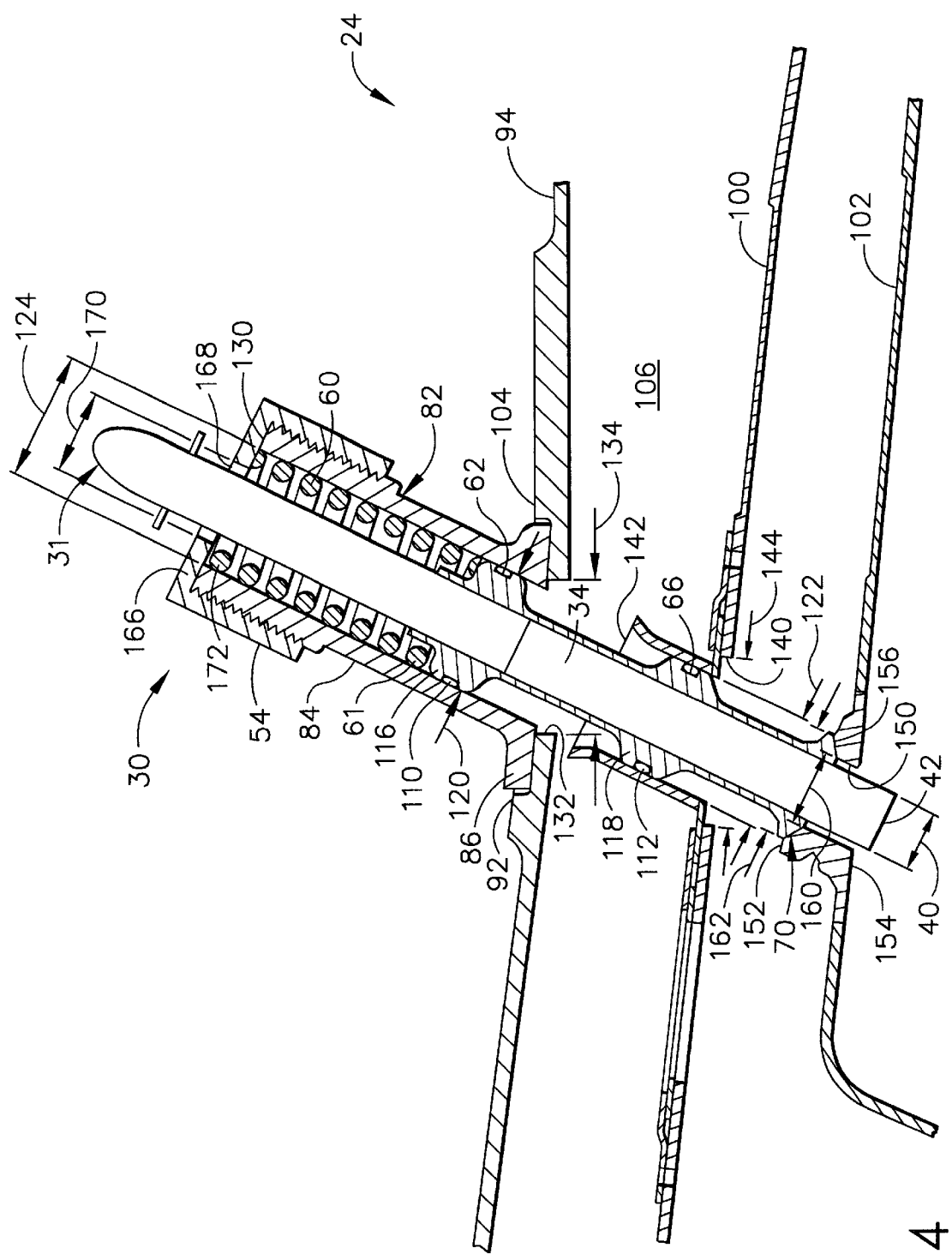
FIG. 4 is a cross-sectional view of the igniter shown in FIG. 3 attached to an augmenter.

FIG. 4 is a cross-sectional view of igniter 30 installed to augmenter 24. Augmenter 24 includes augmenter duct 94, an augmenter liner 100, and a flameholder 102. Augmenter duct 94 is circumferentially disposed around augmenter liner 100 and provides an outer surface 104 to which igniter housing 82 is anchored. Augmenter liner 100 is circumferentially disposed around flameholder 102 and seperates a cooling air annulus 106 from flameholder 102. Cooling air annulus 106 is positioned between augmenter duct 94 and augmenter liner 100 and provides a passageway through which cooling air flows to cool an exhaust duct (not shown) and augmenter liner 100 of gas turbine engine 10. Flameholder 102 chan-nels hot combustion gases and airflow through augmenter 24 to the gas turbine engine exhaust duct.

Igniter lead 31 includes a first o-ring 110 and a second o-ring 112. First o-ring 110 is sized to fit within o-ring groove 62 and second o-ring 112 is sized to fit within o-ring groove 66. O-ring groove 62 has a slightly larger diameter (not shown) than a diameter (not shown) of oaring groove 66. Each groove 62 and 66 is defined within an annular projection 116 and 118 extending radially outward from igniter lead 31. Annular projection 116 has a diameter 120 and annular projection 118 has a diameter 122. Diameter 120 is slightly smaller than an inner diameter 124 of igniter housing 82 which permits first o-ring 110 to be in sealable contact with igniter housing 82 when igniter lead 31 is fully installed within augmenter 24. O-ring 110 prevents cooling air from escaping through igniter housing 82.

Igniter second body portion 34 is initially inserted through a first end 130 of a loosely mounted igniter housing first body portion 84 and through igniter housing second body portion 86. Igniter second housing second body portion 86 is inserted within housing pad 92 and igniter housing 82 is secured to augmenter duct 94 with fasteners.

Igniter lead 31 is then inserted through an opening 132 disposed within augmenter duct 94. Opening 132 has a diameter 134 substantially equal to inner diameter 124 of igniter housing 82. Housing pad 92 is positioned circumferentially around opening 132.

Igniter lead 31 is further inserted through cooling air annulus 106 into an opening 140 disposed within augmenter liner 100. A floating ferrule 142 extends from opening 140 into cooling air annulus 106. Floating ferrule 142 is substantially cylindrical and is substantially co-axial with igniter housing 82 and igniter second body portion 34 after igniter housing 82 is attached to augmenter duct 94. Opening 140 and floating ferrule 142 have a diameter 144 which is slightly larger than diameter 122 of annular projection 118. Accordingly, when o-ring 112 is installed within groove 66 and igniter 30 is attached to augmenter 24, o-ring 1 12 is in sealable contact with floating ferrule 142. The sealable contact between o-ring 1 12 and floating ferrule 142 prevents fuel from escaping through augmenter liner 100 into cooling air annulus 106.

Igniter lead 31 is then inserted through an opening 150 disposed within flameholder 102 and extends radially outward from flameholder 102. Opening 150 is cylindrical and has a top edge 152 and a base edge 154. Base edge 154 extends from flameholder 102 to top edge 152. Top edge 152 is conical to receive igniter alignment support boss 70. Alignment support boss 70 has a spherical cross-sectional profile 156 which includes a first diameter 160 and a second diameter 162. First diameter 160 extends from igniter lead 31 and is substantially equal to igniter lead diameter 40. Second diameter 162 is larger than first diameter 160 and extends from igniter lead 31 between first diameter 160 and augmenter liner 100. The combination of alignment support boss spherical profile 156 and chamfered opening 150 permits igniter lead 31 to be fully inserted within augmenter 24 while igniter tip 42 is simultaneously self-aligned in proper alignment for gas turbine engine operation.

Igniter self-locking nut 54 includes a cap 166 which has an opening 168. Opening 168 has a diameter 170 which is larger than igniter diameter 40 and is smaller than diameter 52 of nut retaining collar 50. Cap opening diameter 170 permits igniter lead 31 to pivot with respect to augmenter 24 and igniter housing 82 while maintaining the seal between o-ring 110 and igniter housing 82.

As self-locking nut 54 is tightened, self-locking nut cap 166 contacts a first end 172 of compression spring 60 while compression spring second end 61 is in contact with annular projection 116. Tightening self-locking nut 54 compresses compression spring 60 and biases igniter 30 against augmenter 24 to maintain igniter tip 42 at a proper immersion depth within flameholder 102. Additionally, as self-locking nut is tightened, o-ring 110 maintains sealable contact with igniter housing 82 and o-ring 112 maintains sealable contact with floating ferrule 142. Alternatively, the compression spring 60 can be tapered in that the first end 172, which has a diameter approximately the same as the inner diameter 124 of the igniter housing 82, is smaller or larger than the second end 61.

During operation of gas turbine engine 10, augmenter 24 is subjected to high temperatures and pressures which cause thermal growth and tolerance stack-up. As a result of the thermal growth, igniter tip 42 is forced outward from flameholder 102 towards augmenter duct 94. Compression spring 60 biases igniter 30 against flameholder to maintain igniter tip 42 at a proper immersion depth within augmenter 24 during gas turbine engine operations. Furthermore, compression spring 60 biases alignment support boss 70 to remain in contact with flameholder opening 150 sealing the gas path. The combination of spherical and conical alignment support boss 70 and chamfered flameholder opening 150 maintains igniter tip 42 in proper alignment within augmenter 24 during engine operation and permits radial, axial, and tangential movement capability of igniter lead 31. In one embodiment, the radial movement capablity is approximately equal to 0.45 inches.

The above-described igniter is cost-effective and highly reliable. The igniter includes an igniter housing and a biasing mechanism. The igniter is secured to the igniter housing with a self-locking nut and remains in slidable contact with the igniter housing after the self-locking nut is tightened. The biasing mechanism permits the igniter to move radially when subjected to thermal strains and growths, while maintaining a proper immersion depth of an igniter tip. As a result, an igniter is provided which permits an augmenter to operate with a uniform ignition. Thus, a corresponding gas turbine engine may operate with a high efficiency and performance.

While the invention has been described in terms of various specific embodiments, those skilled in the art will recognize that the invention can be practiced with modification within the spirit and scope of the claims.

What is claimed is:

1. A method for providing a uniform ignition in an gas turbine engine augmenter using at least one augmenter igniter, the augmenter including a flameholder and an augmenter duct, each augmenter igniter including a biasing mechanism and an igniter lead, the biasing mechanism biasing and coupled to the igniter lead, the igniter lead including a first body portion and a second body portion, the first body portion extending from the second body portion to an igniter end, the second body portion extending from the first body portion to an igniter tip, said method comprising the steps of:

installing the at least one igniter within the gas turbine engine augmenter;

coupling the biasing mechanism to the igniter lead;

installing the biasing mechanism to maintain the igniter tip at a constant immersion depth within the augmenter; and operating the gas turbine engine.

2. A method in accordance with claim 1 wherein the igniter further includes an igniter housing and an igniter self-locking nut, the igniter housing circumferentially disposed around the igniter second body portion, the igniter self-locking nut configured to engage the igniter housing, said step of coupling the biasing mechanism further comprises the steps of:

connecting the igniter housing to the augmenter duct; and securing the igniter lead within the igniter housing with the igniter self-locking nut.

3. A method in accordance with claim 2 wherein the augmenter further includes an augmenter liner and the igniter further includes a floating ferrule circumferentially disposed around the igniter lead second body portion, said step of installing the igniter further comprises the step of inserting the igniter into the augmenter through the floating ferrule.

4. A method in accordance with claim 3 wherein the igniter further includes a first groove sized to receive a first o-ring and a second groove sized to receive a second o-ring, said step of inserting the igniter into the augmenter further comprising the step of positioning the igniter within the augmenter such that the first o-ring is in sealable contact with the floating ferrule and the second o-ring is in sealable contact with the igniter housing.

5. A method in accordance with claim 4 further comprising the step of aligning the igniter within the augmenter.

6. A method in accordance with claim 5 wherein the flameholder includes a chamfered seat opening, said step of aligning the igniter further comprising the step of inserting the igniter through the chamfered seat opening.

7. A method in accordance with claim 6 wherein the igniter further includes an alignment support boss circumferentially disposed around the igniter lead proximate the igniter tip, said step of aligning the igniter within the augmenter further comprising the step of seating the igniter alignment support boss within the chamfered seat opening.

8. An augmenter igniter for a gas turbine engine, the engine including a flameholder and an augmenter duct, said augmenter igniter comprising:

an igniter lead comprising a first body portion, a second body portion, an igniter tip, and an igniter end, said first body portion extending from said second body portion to said igniter end, said second body portion extending from said first body portion to said igniter tip; and a biasing mechanism coupled to said igniter lead to bias said igniter lead against the flameholder to maintain said igniter tip at a substantially constant immersion depth during gas turbine engine operation.

9. An augmenter igniter in accordance with claim 8 further comprising an igniter housing and an igniter self-locking nut, said igniter housing circumferentially disposed around said igniter second body portion and configured to connect to the augmenter duct, said igniter self-locking nut configured to engage said igniter housing and secure said igniter lead within said igniter housing.

10. An augmenter igniter in accordance with claim 8 wherein the engine further includes an augmenter liner, said augmenter igniter further comprising a floating ferrule circumferentially disposed around said igniter lead second body portion and configured to permit said igniter to move with respect to the augmenter liner.

11. An augmenter igniter in accordance with claim 10 wherein said igniter second body portion comprises a plurality of grooves circumferentially disposed around said igniter lead, said plurality of grooves configured to receive a plurality of o-rings.

12. An augmenter igniter in accordance with claim 11 wherein said plurality of grooves comprises a first groove and a second groove, said igniter housing circumferentially disposed around said first groove, said floating ferrule circumferentially disposed around said second groove.

13. An augmenter igniter in accordance with claim 12 wherein said biasing mechanism comprises a compression spring circumfentially disposed around said igniter lead within said igniter housing.

14. An augmenter igniter in accordance with claim 13 further comprising an alignment support boss circumferentially disposed around said igniter lead.

15. An augmenter igniter in accordance with claim 14 wherein said alignment support boss is spherical-shaped and is configured to align said igniter tip.

16. An augmenter for a gas turbine engine comprising:

a flameholder comprising at least one opening;

an augmenter duct circumferentially disposed around said flame holder and comprising at least one opening; and at least one igniter inserted through said flameholder and said augmenter duct, said igniter comprising an igniter lead, an igniter tip extending from said igniter lead, and a biasing mechanism coupled to said igniter lead to bias said igniter lead against said augmenter, said biasing mechanism configured to maintain said igniter tip at a constant immersion depth within said augmenter.

17. An augmenter in accordance with claim 16 further comprising an augmenter liner, said igniter further comprising an igniter housing, an igniter self-locking nut, a body, and a floating ferrule, said igniter housing circumferentially disposed around said igniter body and configured to connect to said augmenter duct, said igniter self-locking nut securing said igniter lead within said igniter housing, said floating ferrule circumferentially disposed around said igniter lead and configured to permit said igniter to move with respect to said augmenter liner.

18. An augmenter in accordance with claim 17 wherein said flameholder comprises at least one chamfered seat opening, said igniter further comprises an alignment support boss circumferentially disposed around said igniter lead proximate said igniter tip, said chamfered seat opening configured to receive said alignment support boss.

19. An augmenter in accordance with claim 18 wherein said igniter further comprises a first groove sized to receive a first o-ring and a second groove sized to receive a second o-ring, said igniter housing circumferentially disposed around said first groove, said floating ferrule circumferentially disposed around said second groove, said igniter housing in sealable contact with said first o-ring, said floating ferrule in sealable contact with said second o-ring.

20. An augmenter in accordance with claim 19 wherein said igniter biasing mechanism is a compression spring that is tapered.

\* \* \* \* \*